(12) United States Patent
Hahlweg

(10) Patent No.: US 6,640,201 B1
(45) Date of Patent: Oct. 28, 2003

(54) METHOD FOR COMPARING POINTS SETS

(75) Inventor: Cornelius Hahlweg, Hildesheim (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/869,662

(22) PCT Filed: Oct. 15, 1999

(86) PCT No.: PCT/DE99/03314

§ 371 (c)(1),
(2), (4) Date: Nov. 13, 2001

(87) PCT Pub. No.: WO00/39746

PCT Pub. Date: Jul. 6, 2000

(30) Foreign Application Priority Data

Dec. 29, 1998 (DE) .......................................... 198 60 679

(51) Int. Cl.[7] .......................... G06F 17/10; G01C 21/00
(52) U.S. Cl. ....................................... 702/159; 382/294
(58) Field of Search ........................ 702/159; 345/427, 345/634; 382/154, 294, 312

(56) References Cited

FOREIGN PATENT DOCUMENTS

DE   10021535   *  5/2000

OTHER PUBLICATIONS

Pickens D.R. et al., "Digital image motion correction by spatial wrap methods", Med. Physics vol 14(1), pp. 56–61, Jan./Feb. 1987.*

Leon W. Couch II "Digital and Analog communication" Second edition, pp. 202–221 (chapter 4, sections 4.1–4.2), book publication date 1987.*

* cited by examiner

Primary Examiner—Kamini Shah
(74) Attorney, Agent, or Firm—Kenyon & Kenyon

(57) ABSTRACT

In order to compare two two-dimensional sets of points ($P_1, P_2, \ldots, P_5; G_1, G_2, \ldots G_5$), an equation system is solved that can be obtained by generating a transformation equation for the first set of points with variable parameters and determining the values of the parameters for which the sum over all squared distances between the transformed points $P_i'$ of the first set and the assigned points $G_i$ of the second set assumes a minimum, the values of the parameters obtained in this way being used as a measure of the similarity of the sets of points ($P_1, P_2, \ldots, P_5; G_1, G_2, \ldots G_5$).

9 Claims, 2 Drawing Sheets

METHOD FOR COMPARING POINTS SETS

FIELD OF THE INVENTION

The present invention relates to a method for comparing two-dimensional sets of points.

BACKGROUND INFORMATION

A two-dimensional set of points may be understood to mean any type of arrangement of objects or features on a plane. Methods for comparing continuous two-dimensional sets of points such as images or sections of images are known. In these methods, for example cross-correlation methods (in the original range and the frequency range) are used to find matches between a plurality of sets. These methods require a great deal of processing power, as large quantities of data must be processed; moreover, as a general rule these methods can only recognize a limited range of types of similarity. Thus, for example, if conventional cross-correlation in Cartesian coordinates is applied to two image sections, it is possible to calculate a translation vector by which one of the two images must be shifted in order to superimpose it on the second with as great a similarity as possible; however, if Cartesian cross-correlation is used, it goes unnoticed that possibly greater similarity or even identity can be achieved by deforming, compressing or rotating an image. Vice versa, if cross-correlation in polar coordinates is used, it is possible to determine whether two images can be converted into one another via compressing and rotating, but if in addition a translation is required the similarity goes unnoticed.

SUMMARY OF THE INVENTION

The present invention constitutes a method for comparing two-dimensional sets of points that makes it possible to recognize many different types of similarity with very little processing power, and makes it possible, for example, to recognize that two sets of points are identical if one can be created from the other via a combination of rotation, translation and compression or stretching. It was unanticipated that to accomplish this it is simply necessary to assign exactly one point $G_i$ of the second set to each point $P_i$ of the first set and then to solve an equation system that can be obtained in the following way: first, a transformation equation $P'_i = T(P_i)$ is generated for points $P_i$ of the first set, transformation function T having a plurality of variable parameters $a_j$, and the values of parameters $a_j$ for which the sum over i of the squared distances between $P'_i$ and $G_i$ assumes a minimum are determined. The values of parameters $a_j$ obtained in this way are used as a measure of the similarity of the sets of points. Conventional methods of analysis can be used to determine the values of parameters $a_j$ that are to be found.

The method is particularly easy to use if each point $P_i$, $G_i$ respectively is represented by a complex number.

A method for comparing two-dimensional sets of points in which transformation function T is in the form of a polynomial is a preferred special case of the method according to the present invention. In this case, the values of parameters $a_i$ for which the sum of the squared distances apart assumes a minimum are indicated via equation system 1.

$$\begin{pmatrix} \sum_i G_i P_i^{n*} \\ \vdots \\ \sum_i G_i P_i^* \\ \sum_i G_i \end{pmatrix} = \begin{pmatrix} \sum_i P_i^n P_i^{n*} & \cdots & \sum_i P_i P_i^{n*} & \sum_i P_i^{n*} \\ \vdots & & \vdots & \vdots \\ \sum_i P_i^n P_i^* & \cdots & \sum_i P_i P_i^* & \sum_i P_i^* \\ \sum_i P_i^n & \cdots & \sum_i P_i & \sum_i 1 \end{pmatrix} \begin{pmatrix} a_n \\ \vdots \\ a_1 \\ a_0 \end{pmatrix} \quad (1)$$

Solving linear equation systems of this kind does not present any difficulties and can be accomplished with the help of an appropriately programmed computer or microprocessor via a fully automated process.

In order to use the method for comparing images that include a continuous set of points, it is sufficient to select a number of characteristic points from each of the two images to be compared and thus to generate sets of points { . . . , $P_i$, . . . }, { . . . , $G_i$, . . . } to which the method according to the present invention can be applied.

The selected points may involve, for example, the eyes, ears or other pronounced points on the image of a face which may be marked by the person performing operations, or they may also be determined via a fully automated process, so that the similarity between the person shown in the image and a second image or collection of images can be determined.

Another important application is, for example, joining together partially overlapping images, in particular maps. This problem arises in particular with maps displayed electronically in modern vehicle navigation systems. Navigation systems of this kind may have a set of maps of a region in which the driver of a motor vehicle may be moving, these maps partially overlapping but not transitioning continuously into one another. If maps of this kind have been obtained from different manufacturers, there may be differences in the type of projection, the scale and the orientation, which may make it difficult for the navigation system to switch from one map sheet to another. In such cases, with the help of the method according to the present invention it is possible to select a set of pronounced points, such as road intersections on one of the maps, to select a corresponding set in a second map, and to assign each point of one set to exactly one point of the other set, a hypothesis as to which selected intersections may correspond to one another being generated, and a comparison then being carried out using the method according to the present invention. If this comparison does not yield a sufficient level of matching, a new set of points is selected in one of the maps and a new comparison is carried out, it being of course possible for the newly selected set of points to contain elements of the previous set.

Further features and advantages of the present invention are given in the description of exemplary embodiments below, with reference to the figures.

DETAILED DESCRIPTION

Figure 1:
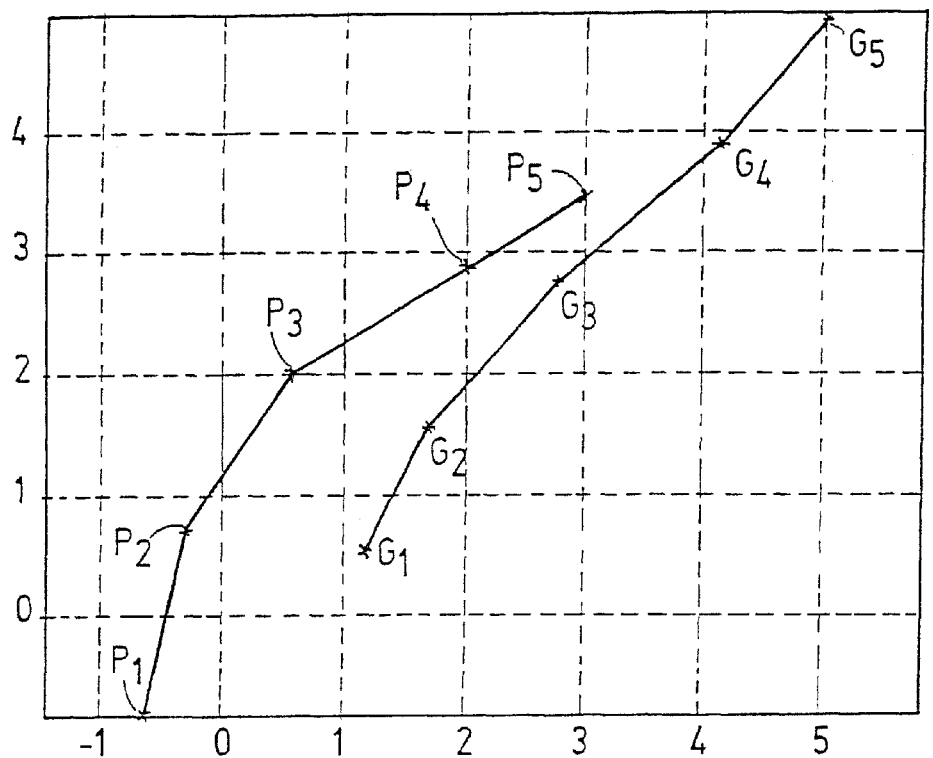
FIG. 1 shows two sets of points in a plane to which the method according to the present invention may be applied.

FIG. 1 shows two sets of points $P_1, \ldots P_5$ and $G_1, \ldots G_5$; to help show they are associated with one another, each set is joined by a line; the points are plotted in a coordinate grid. Each of these points is characterized by two coordinate values, which in this case are conceived as the real component and the imaginary component of a complex number. The real component and the imaginary component are plotted on the ordinate and the abscissa of the coordinate system.

The points may each constitute the coordinates of pronounced locations on two maps such as road intersection or the like, these two maps being stored in a navigation system of a motor vehicle; however, for example, points $P_1$ and $P_5$ could also constitute a series of positions of the motor vehicle determined with the help of a GPS system, and points $G_1$ to $G^5$ could constitute the path of a road shown on a map in the navigation system.

In order to be able to decide whether both sets of points belong to the same object, i.e. in this case whether they represent the same road, it is necessary to assess their similarity. To accomplish this, transformation T is sought which converts the set of points $P_i$ into the set of points $P'_i$ for which the sum of the distance squares $|P'_i - G_i|^2$ is a minimum. This transformation T is in the form of a polynomial $$P'_i = T(P_i) = a_n \cdot P^n + \ldots a_2 \cdot P^2 + a_1 \cdot P + a_0 \qquad (2)$$

Just as with points $P_i$, coefficients $a_n$ to $a_0$ are conceived as complex numbers. Herein, $a_0$ represents a straightforward shift transformation, and $a_1$ represents a rotate/stretch transformation. In view of the standard terminology used in electronics for characteristic curve parameters, it is proposed that the quadratic coefficient $a_2$ be designated a "curve", and the cubic coefficient $a_3$ be designated a "turn".

The extremal requirement that the squares of the distance apart be a minimum can be written as $$\sum_i (P'_i - G_i) \cdot (P'_i - G_i)^* \Rightarrow \text{Min} \qquad (3)$$

Combining equations 2 and 3 results in the following equation:

$$\sum_i (a_n \cdot P_i^n + \ldots + a_2 \cdot P_i^2 + a_1 \cdot P_i + a_0 - G_i) \cdot \qquad (4)$$

$$(a_n \cdot P_i^n + \ldots + a_2 \cdot P_i^2 + a_1 \cdot P_i + a_0 - G_i)^* \Rightarrow \text{Min}$$

From this it is possible to obtain equation system (1) by generating partial derivatives $$\frac{\partial}{\partial a_j^*}, j = 0, 1 \ldots, n.$$

If it is assumed that sets of points $P_i$ and $G_i$ must be converted into one another via translation and rotation/stretching, i.e. via rotation and modification of the scale, it is sufficient to consider equation (1) for the case n=1. In this case the following equation is obtained after equation (4) has been simplified:

$$\sum_i (a_n \cdot P_i^n + a_0 - G_i) \cdot (a_1 \cdot P_i + a_0 - G_i)^* \Rightarrow \text{Min}. \qquad (5)$$

After partial derivatives $$\frac{\partial}{\partial a_0^*}$$

and $$\frac{\partial}{\partial a_1^*}$$

have been generated and equating to zero has been carried out, the following equation system is obtained:

$$\begin{pmatrix} \sum_i G_i \cdot P_i^* \\ \sum_i G_i \end{pmatrix} = \begin{pmatrix} \sum_i P_i \cdot P_i^* & \sum_i P^* \\ \sum_i P_i & \sum_i 1 \end{pmatrix} \begin{pmatrix} a_1 \\ a_0 \end{pmatrix} \qquad (6)$$

Methods for solving this equation system are known and do not need to be described in detail. As a solution the coefficients $a_1$, $a_0$ are obtained which yield the transformation equation of the form $$P = a_1 \cdot P + a_0$$

having the minimum error square.

Linear complex coefficient $a_1$ contains the angle of rotation (phase and argument) and the stretching and change of scale (amount) relative to G. Scalar coefficient $a_0$ indicates the translation. For the points shown in FIG. 1, calculation of the coefficients yielded the following results:

| Coefficient | Complex Value | Amount | Argument/° |
|---|---|---|---|
| a1 | 0.9146 − 0.0209i | 0.9148 | −1.3091 |
| a0 | 2.1442 + 1.1495i | 2.4329 | 28.1956 |

Figure 2:
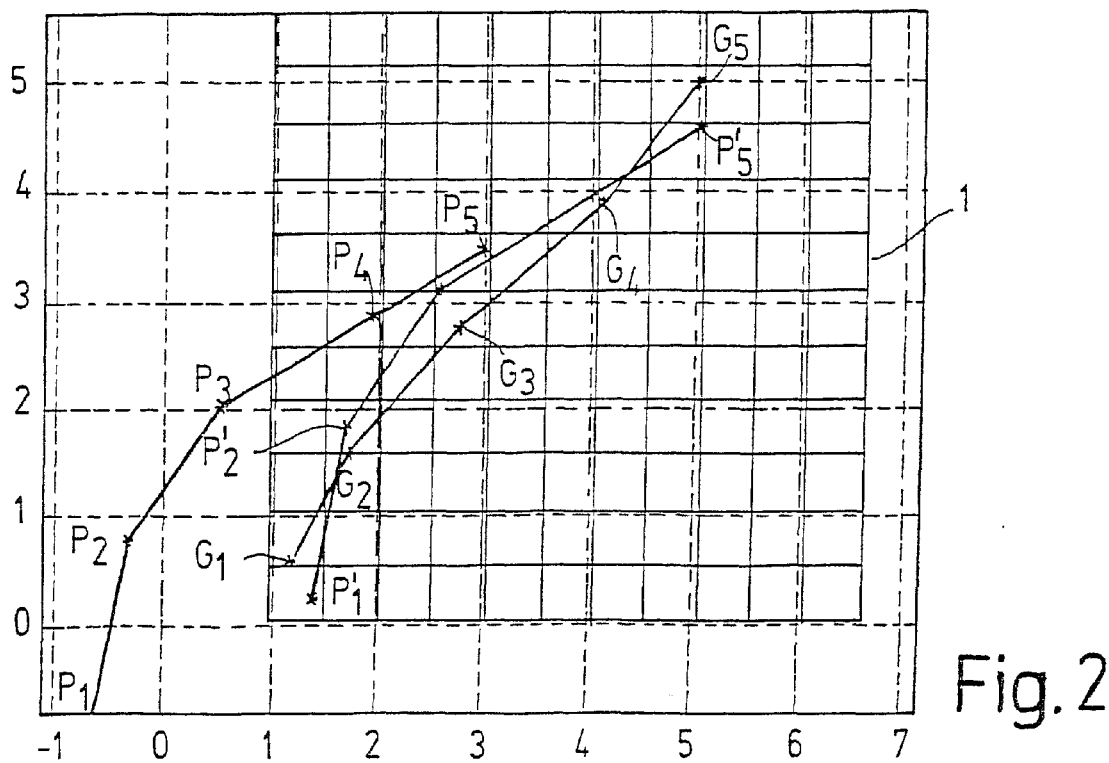
FIG. 2 is a first illustration of results from methods according to the present invention using polynomials of different orders.

Thus the transformation that produces the greatest similarity between sets of points $P_i$ and $G_i$ includes a 0.9-fold compression of set $P_i$, rotation of −1.3° and a shift of 2.4 in the direction 28°. The result is shown in FIG. 2, the coordinate grid of FIG. 1 in which points $P_1$ to $P_5$ are embedded having also been transformed so as to make the transformation clearer.

Calculating the value of the error square from equation (3) yields a measure of the similarity of the two sets of points.

If this error square exceeds a predefined boundary value, this suggests the two sets of points do not correspond to one another, and a different set of points from the map can be selected and the method applied once again thereto, until a modification is achieved that has an error square which is so small that it is fair to assume there is a match between the sets of points that have been selected.

Transformation parameters which take into account curves and turns can be found in an analogous manner to that described above. Thus, for example, using a transformation involving a quadratic polynomial $T(P_i) = a_2 P_i^2 + a_1 P_i + a_0$ results in the following equation system:

$$\begin{pmatrix} \sum_i G_i \cdot P_i^2 \\ \sum_i G_i \cdot P_i^* \\ \sum_i G_i \end{pmatrix} = \begin{pmatrix} \sum_i P_i^2 \cdot P_i^{2*} & \sum_i P_i \cdot P_i^{2*} & \sum_i P^{2*} \\ \sum_i P_i^2 \cdot P_i^* & \sum_i P_i \cdot P_i^* & \sum_i P^* \\ \sum_i P_i^2 & \sum_i P_i & \sum_i 1 \end{pmatrix} \begin{pmatrix} a_2 \\ a_1 \\ a_0 \end{pmatrix} \quad (12)$$

Solving this equation system yields the following results for the points $P_1$ to $P_5$ and $G_1$ to $G_5$ shown:

| Coefficient | Complex Value | Amount | Argument/° |
|---|---|---|---|
| a2 | 0.0272 − 0.0113i | 0.0295 | −22.5600 |
| a1 | 0.8311 − 0.0945i | 0.8365 | −6.4869 |
| a0 | 2.0826 + 1.1371i | 2.3728 | 28.6345 |

A statement regarding the similarity may now be obtained, for example, via the ratio of the amount of quadratic coefficient $a_2$ to the amount of linear coefficient $a_1$, i.e. via the non-linear part of the transformation:

$$\frac{(a_2)}{(a_1)} = 0.035$$

Figure 3:
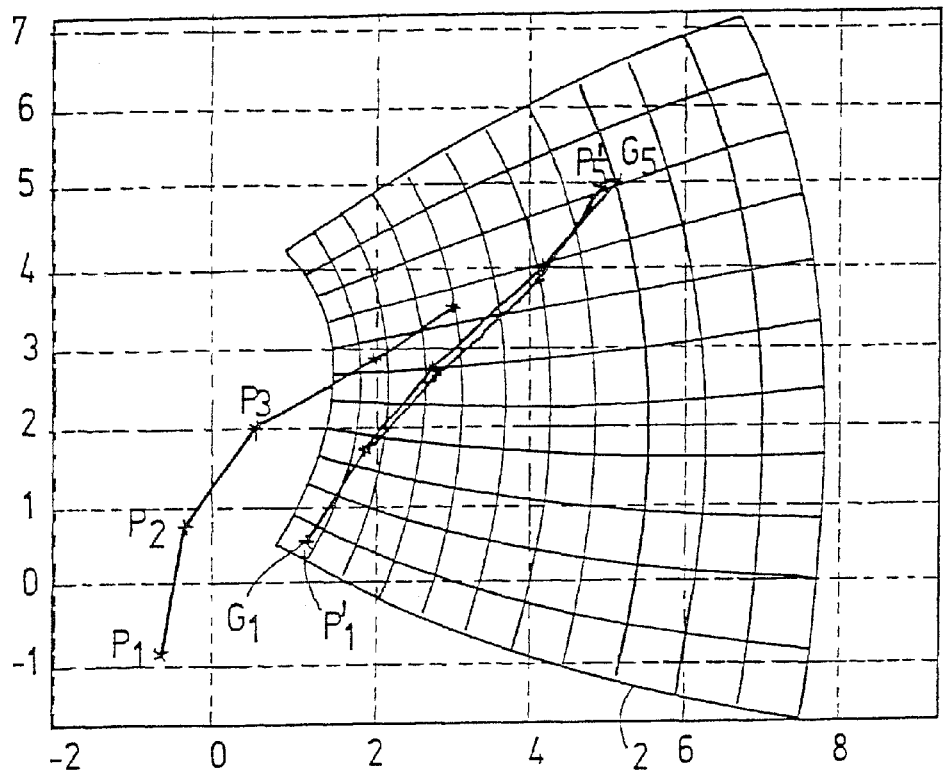
FIG. 3 is a second illustration of results from methods according to the present invention using polynomials of different orders.

The result of the transformation is shown in FIG. 3, the transformation also having been carried out on the coordinate grid of points $P_1$ to $P_5$, the result of which is deformed grid 2.

Figure 4:
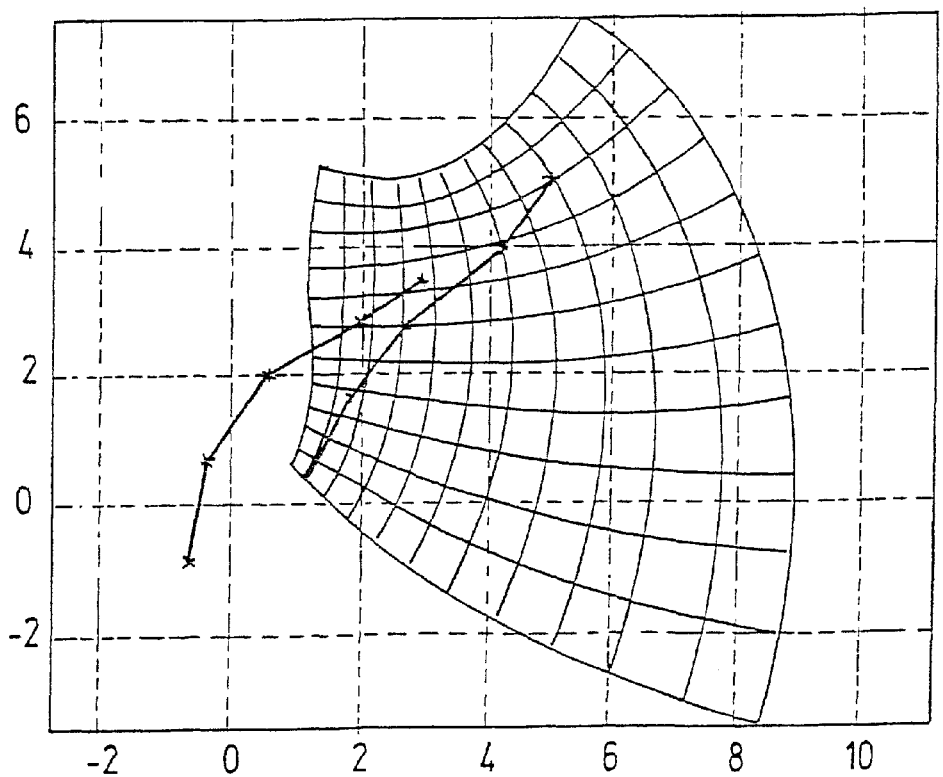
FIG. 4 is a third illustration of results from methods according to the present invention using polynomials of different orders.

FIG. 4 shows the result of a transformation using cubic polynomial T having coefficients $a_3$, $a_2$, $a_1$, $a_0$ that have been optimized according to the method described above. The coefficients are indicated in the table below:

| Coefficient | Complex Value | Amount | Argument/° |
|---|---|---|---|
| a3 | −0.0048 − 0.0136i | 0.0144 | 109.4400 |
| a2 | 0.1109 − 0.0219i | 0.1130 | −11.1708 |
| a1 | 0.8353 − 0.1845i | 0.8554 | −124554 |
| a0 | 2.0541 + 0.9899i | 2.2802 | 25.7301 |

Herein, it is important to note that when the error amount square method is used, for each higher order of modification, new values of the individual coefficients are produced, and the sum of the error squares becomes smaller and smaller the more optimizable coefficients are used. Therefore the change in a coefficient associated with the transition to the next higher modification level may also be used as a measure of the similarity.

What is claimed is:

1. A method for joining partially overlapping images in which a first two-dimensional set of points from one of the images and a second two-dimensional set of points from another of the images are compared with one another, comprising the steps of:

representing each point as a complex number;

assigning exactly one point of the second set of points unambiguously and invertably to each individual point of the first set of points; and solving an equation system that can be obtained by generating a transformation equation for the first set of points with variable parameters of a transformation function and determining values of the variable parameters for which a sum over all squared values of a distance between a transformed point of the first set of points and a corresponding point of the second set of points assumes a minimum, the values of the variable parameters serving as a measure of a similarity of the first set of points and the second set of points.

2. The method according to claim 1, wherein:

the partially overlapping images include maps.

3. A method for joining partially overlapping images in which a first two-dimensional set of points from one of the images and a second two-dimensional set of points from another of the images are compared with one another, comprising the steps of:

representing each point as a complex number;

assigning exactly one point of the second set of points unambiguously and invertably to each individual point of the first set of points; and solving the equation system $$\begin{pmatrix} \sum_i G_i P_i^{n*} \\ \vdots \\ \sum_i G_i P_i^* \\ \sum_i G_i \end{pmatrix} = \begin{pmatrix} \sum_i P_i^n P_i^{n*} & \cdots & \sum_i P_i P_i^{n*} & \sum_i P_i^{n*} \\ \vdots & & \vdots & \vdots \\ \sum_i P_i^n P_i^* & \cdots & \sum_i P_i P_i^* & \sum_i P_i^* \\ \sum_i P_i^n & \cdots & \sum_i P_i & \sum_i 1 \end{pmatrix} \begin{pmatrix} a_n \\ \vdots \\ a_1 \\ a_0 \end{pmatrix} \quad (1)$$

the values of parameters $a_0$, $a_1$, ... serving as a measure of a similarity of the first set of points and the second set of points.

4. The method according to claim 3, wherein:

the partially overlapping images include maps.

5. The method according to claim 3, wherein:

a number of points of one of the first set of points and the second set of points is greater than a number of the parameters.

6. The method according to claim 3, wherein:

a number of the parameters is smaller than 5.

7. A method for assessing a similarity of two images, comprising the steps of:

a) selecting a number of characteristic points from each image to generate sets of points;

b) representing each point as a complex number;

c) assigning exactly one point of a first set of points unambiguously and invertably to each individual point of a second set of points; and d) solving an equation system that can be obtained by generating a transformation equation for the first set of points with variable parameters of a transformation function and determining the values of the variable parameters for which a sum over all squared values of a distance between a transformed point of the first set of points and a corresponding point of the second set of points assumes a minimum, the values of the variable parameters serving as a measure of a similarity of the first set of points and the second set of points.

8. The method according to claim 7, further comprising the step of:

repeating steps a) to d) a plurality of times, a first one of the images remaining the same and a second one of the images being switched between repetitions so that the image that is most similar to the first image can be found from a plurality of images used as the second image.

9. The method according to claim 7, further comprising the steps of:

repeating steps a) to d) a plurality of times; and between repetitions, modifying at least one element of at least one of the first set of points and the second set of points.

* * * * *